(12) United States Patent
Yamamoto

(10) Patent No.: US 10,442,016 B2
(45) Date of Patent: Oct. 15, 2019

(54) CUTTING INSERT, CUTTING TOOL, AND METHOD OF MANUFACTURING MACHINED PRODUCT

(71) Applicant: KYOCERA Corporation, Kyoto-shi, Kyoto (JP)

(72) Inventor: Masahiro Yamamoto, Moriyama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/536,069

(22) PCT Filed: Dec. 16, 2015

(86) PCT No.: PCT/JP2015/085273
§ 371 (c)(1),
(2) Date: Jun. 14, 2017

(87) PCT Pub. No.: WO2016/098829
PCT Pub. Date: Jun. 23, 2016

(65) Prior Publication Data
US 2017/0368615 A1  Dec. 28, 2017

(30) Foreign Application Priority Data
Dec. 17, 2014  (JP) .................................. 2014-255188

(51) Int. Cl.
*B23C 5/20*  (2006.01)
*B23C 5/22*  (2006.01)
*B23C 5/06*  (2006.01)

(52) U.S. Cl.
CPC ............ *B23C 5/207* (2013.01); *B23C 5/2221* (2013.01); *B23C 5/06* (2013.01);
(Continued)

(58) Field of Classification Search
CPC .......... B23C 5/207; B23C 5/202; B23C 5/20; B23C 5/06; B23C 2240/08; B23C 2200/0433; B23C 2200/367; Y10T 407/23
See application file for complete search history.

(56) References Cited

U.S. PATENT DOCUMENTS 1,865,617 A * 7/1932 Curtis .................. B23C 5/2437
407/118
2,407,501 A * 9/1946 Kraus ....................... B23C 5/20
407/48

(Continued)

FOREIGN PATENT DOCUMENTS

DE  102005031988 A1  1/2007
JP  05-138409 A * 6/1993 ............. B23B 27/14

(Continued)

OTHER PUBLICATIONS

Description JP2002254213 obtained at https://worldwide.espacenet.com/ (last visited Oct. 16, 2018).*

(Continued)

*Primary Examiner* — Ryan C Rufo
(74) *Attorney, Agent, or Firm* — Volpe and Koenig, P.C.

(57) ABSTRACT

In an embodiment, a cutting insert includes a body member and a cutting member. The body member is a columnar body, and includes: an upper surface; a lower surface; and an outer side surface between the upper surface and the lower surface. The cutting member is located at a corner part of the outer side surface in the body member. The cutting member includes: at least three surfaces being exposed; and a cutting edge at an intersecting portion of two of the at least three surfaces. The body member includes a through hole penetrating through the upper surface and the lower surface.

9 Claims, 13 Drawing Sheets

(52) U.S. Cl.
CPC .......................... *B23C 2200/0433* (2013.01); *B23C 2200/208* (2013.01); *B23C 2200/367* (2013.01); *B23C 2226/31* (2013.01); *B23C 2226/315* (2013.01)

(56) References Cited

U.S. PATENT DOCUMENTS

| | | | |
|---|---|---|---|
| 4,159,885 A * | 7/1979 | Schott | B23B 27/143 |
| | | | 407/114 |
| 4,728,228 A | 3/1988 | Okunishi et al. | |
| 6,053,672 A * | 4/2000 | Satran | B23C 5/00 |
| | | | 407/40 |
| 6,929,428 B1 | 8/2005 | Wermeister et al. | |
| 9,687,997 B2 * | 6/2017 | Micacchi | B27G 13/10 |
| 2002/0131832 A1 * | 9/2002 | Morsch | B23B 27/045 |
| | | | 407/118 |
| 2003/0039520 A1 * | 2/2003 | Okamura | B23B 27/145 |
| | | | 407/118 |
| 2005/0123365 A1 * | 6/2005 | Goudemond | B23B 27/141 |
| | | | 407/113 |
| 2007/0042217 A1 | 2/2007 | Fang et al. | |
| 2008/0107489 A1 * | 5/2008 | Nesse | B23D 61/04 |
| | | | 407/51 |
| 2008/0145166 A1 | 6/2008 | Lin et al. | |
| 2008/0226402 A1 | 9/2008 | Kammermeier et al. | |
| 2009/0041612 A1 | 2/2009 | Fang et al. | |
| 2010/0202840 A1 * | 8/2010 | Ono | B23B 27/145 |
| | | | 407/118 |
| 2011/0305533 A1 * | 12/2011 | Kisselbach | B23C 5/04 |
| | | | 407/48 |
| 2015/0125223 A1 * | 5/2015 | Morrison | B23B 27/16 |
| | | | 407/5 |
| 2015/0266112 A1 * | 9/2015 | Morrison | B23C 5/2269 |
| | | | 407/108 |

FOREIGN PATENT DOCUMENTS

| | | | | |
|---|---|---|---|---|
| JP | 10-180507 A | * | 7/1998 | ............ B23B 27/14 |
| JP | 2002-254213 A | * | 9/2002 | ............ B23B 27/20 |
| JP | 2003-501280 A | | 1/2003 | |
| JP | 2003-231015 A | | 8/2003 | |
| JP | 2007-175853 A | * | 7/2007 | ............ B23B 27/18 |
| JP | 5272693 B2 | | 8/2013 | |
| WO | WO 9734722 A1 | * | 9/1997 | ........... B23C 5/2221 |
| WO | 2007/022336 A2 | | 2/2007 | |

OTHER PUBLICATIONS

International Search Report, PCT/JP2015/085273, Jan. 26, 2016, 4 pgs.

* cited by examiner

CUTTING INSERT, CUTTING TOOL, AND METHOD OF MANUFACTURING MACHINED PRODUCT

TECHNICAL FIELD

The present embodiments relate to a cutting insert, a cutting tool, and a method of manufacturing a machined product.

BACKGROUND ART

As a cutting insert used when a workpiece, such as metal, is subjected to a milling process, an indexable insert described in Japanese Unexamined Patent Publication No. 2003-231015 (Patent Document 1) has been known. The indexable insert described in Patent Document 1 is made up of an indexable insert body (body member) composed of a sintered body, such as cemented carbide or ceramics, and a diamond insert (cutting edge member). A recessed part is disposed at an intersecting portion of a side flank surface and a front flank surface on a rake surface of the indexable insert body, and an insert is brazed to the recessed part.

The diamond insert is provided with an outer side cutting edge and a bottom cutting edge, namely, the outer side cutting edge and the bottom cutting edge are made of diamond, thereby enhancing the strength of a cutting edge. A through hole extends from a rake surface located at the front in a rotation direction to a surface located at the rear in the rotation direction in the indexable insert. The indexable insert is configured to be attached to a rotary cutting tool body (holder) by inserting a clamp screw member into the through hole.

In the configuration that the cutting edge member is connected to the recessed part in the body member as is the case with the cutting insert described in Patent Document 1, a region with a small thickness is formed between the recessed part and the through hole. Durability can become insufficient in the region with the small thickness, for example, when the cutting insert is miniaturized.

The present embodiments are intended to provide a cutting insert having good durability when the cutting insert is made up of a body member and a cutting edge member.

SUMMARY

In an embodiment, a cutting insert includes: a body member and a cutting member. The body member is a columnar body, and includes: an upper surface; a lower surface; and an outer side surface between the upper surface and the lower surface. The cutting member is located at a corner part of the outer side surface of the body member. The cutting member includes: at least three surfaces being exposed; and a cutting edge at an intersecting portion of two of the at least three surfaces. The body member further includes a through hole penetrating through the upper surface and the lower surface.

EMBODIMENTS

Figure 1:
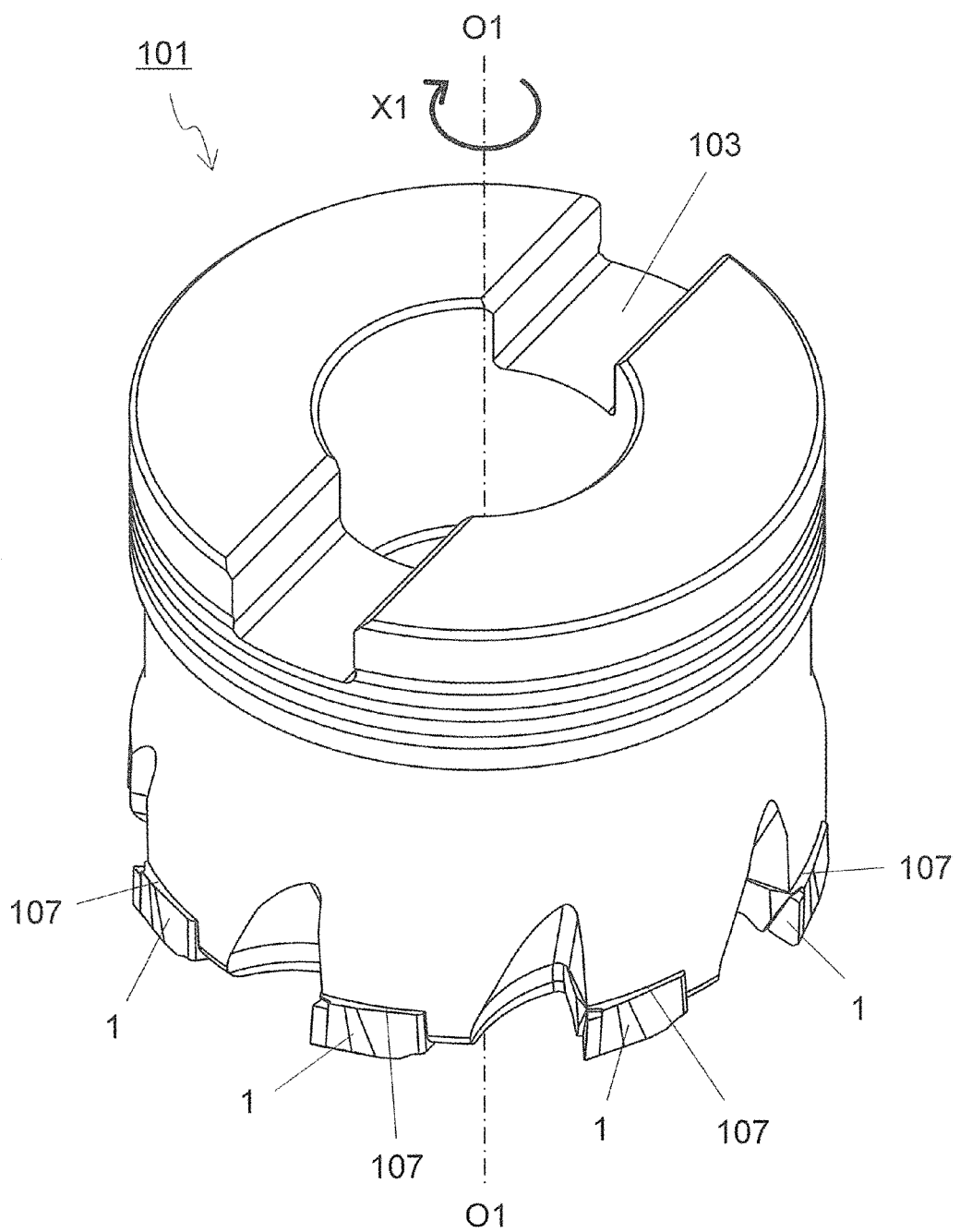
FIG. 1 is a perspective view that shows a cutting tool according to an embodiment.
Figure 2:
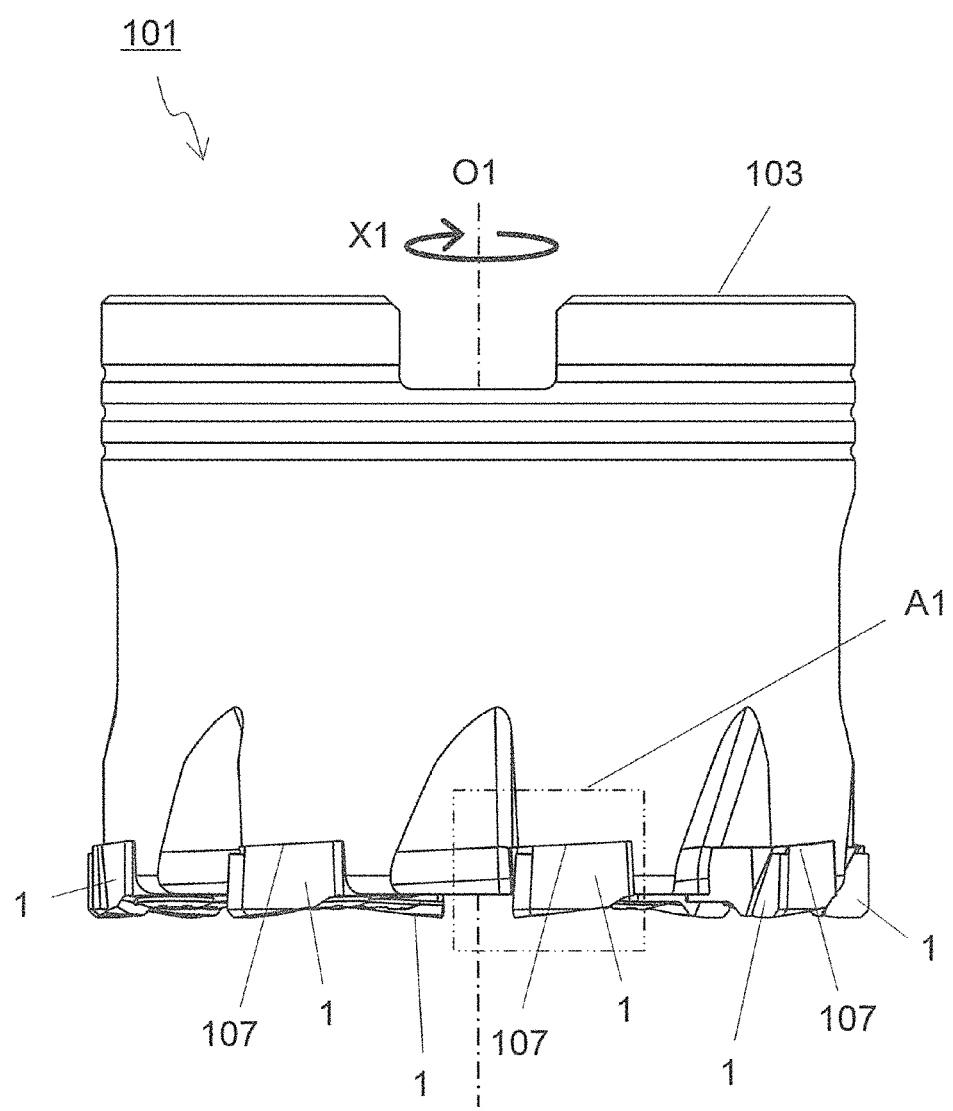
FIG. 2 is a side view of the cutting tool shown in FIG. 1.
Figure 3:
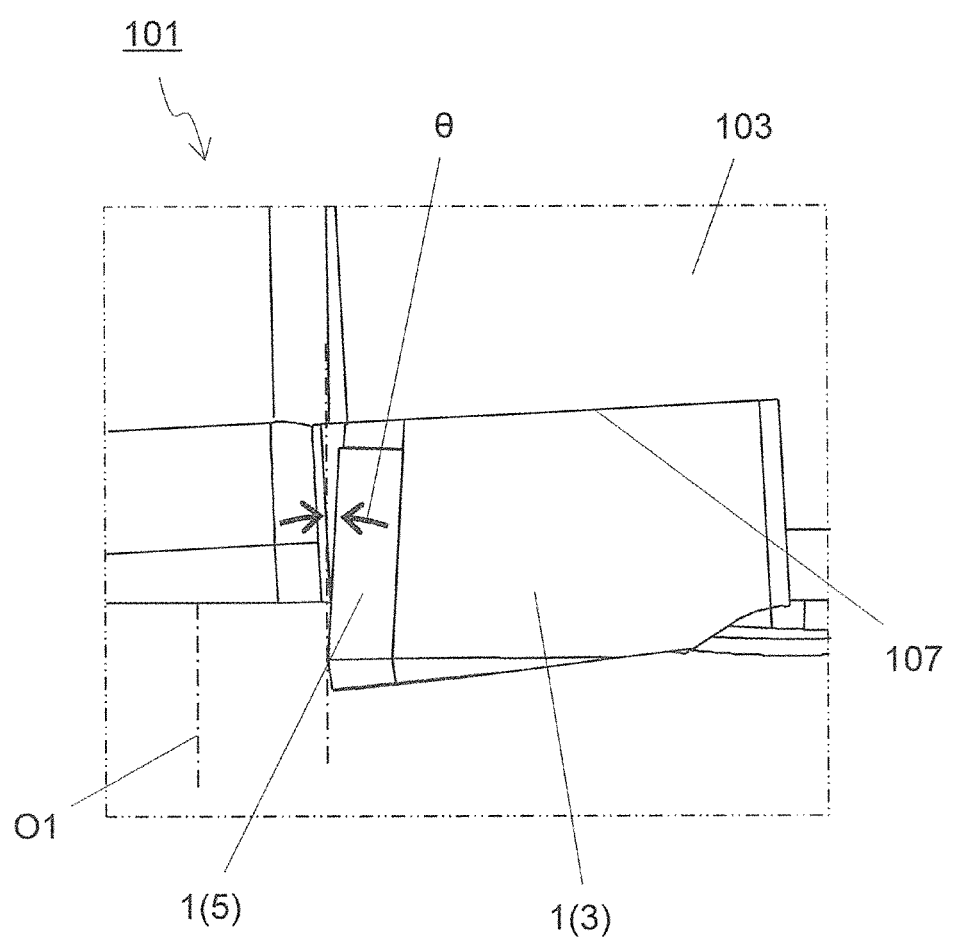
FIG. 3 is an enlarged view in region A1 shown in FIG. 2.

A cutting insert and a cutting tool according to an embodiment are described in detail below with reference to the drawings. For convenience of description, the drawings referred to in the following show, in simplified form, only major components among components of the embodiments. Therefore, the cutting insert and the cutting tool of the present invention may include any optional component not shown in the drawings referred to in the present description. Sizes of the components in the drawings are not faithful to sizes of actual components and to size ratios of these individual components.

In the present embodiment shown in FIGS. 1 to 5, the cutting tool 101 of the present embodiment includes a holder 103, a plurality of cutting inserts 1 (hereinafter also referred to as "inserts 1"), and a screw 105.

The holder 103 has a rotation axis O1. A side where the inserts 1 are located is referred to as a front end side, and the opposite of the front end side is referred to as a rear end side, the holder 103 is a columnar body member extending along the rotation axis O1 from the front end side toward the rear end side. The holder 103 rotates in a rotation direction X1 around the rotation axis O1 about the rotation axis O1 during a cutting process of a workpiece for manufacturing a machined product. In the present embodiment, a central axis of the holder 103 that is the columnar body and the rotation axis O1 of the holder 103 coincide with each other.

Hereinafter, a side close to the rotation axis O1 is referred to as an inner peripheral side, and a side away from the rotation axis O1 is referred to as an outer peripheral side. A direction from the rear end side of the holder 103 toward the front end side thereof is referred to as a front end direction, and a direction from the front end side of the holder 103 to the rear end side thereof is referred to as a rear end direction.

For example, steel, cast iron, or aluminum alloy is usable for the holder 103. In the present embodiment, steel having high toughness among these materials is used for the cutting tool 101. The size of the holder 103 is suitably settable according to the size of a workpiece. For example, a length in the direction along the rotation axis O1 is settable to approximately 30-90 mm. A width (diameter) in a direction orthogonal to the rotation axis O1 is settable to approximately 20-500 mm.

A plurality of insert pockets 107 (hereinafter also referred to as "pockets 107") are located along an outer peripheral side on the front end side of the holder 103. The pockets 107, to which the inserts 1 are respectively attached, open into the outer peripheral side on the front end side of the holder 103 before the attachment of the inserts 1. The pockets 107 may be disposed at equal intervals or unequal intervals so as to have rotational symmetry around the rotation axis O1. The pockets 107 are preferably disposed at equal intervals in order to reduce variations in load applied to the inserts 1 attached to the pockets 107.

The pockets 107 are located on the holder 103, and therefore the holder 103 is not a strict columnar body. Each of the inserts 1 attached to the pockets 107 is fixed to the holder 103 by the screw 105.

Figure 4:
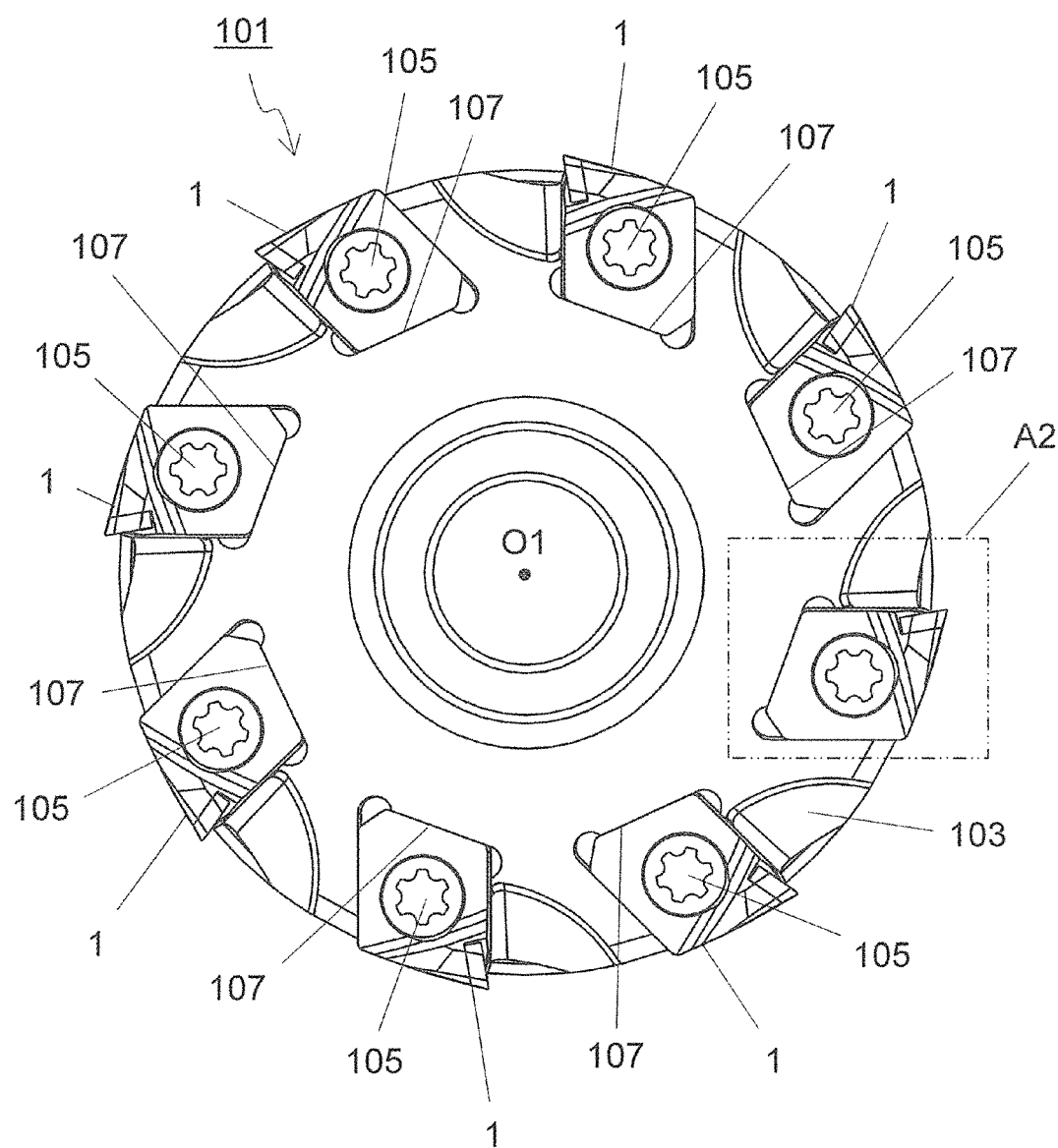
FIG. 4 is a plan view when the cutting tool shown in FIG. 1 is viewed from a front end side.
Figure 5:
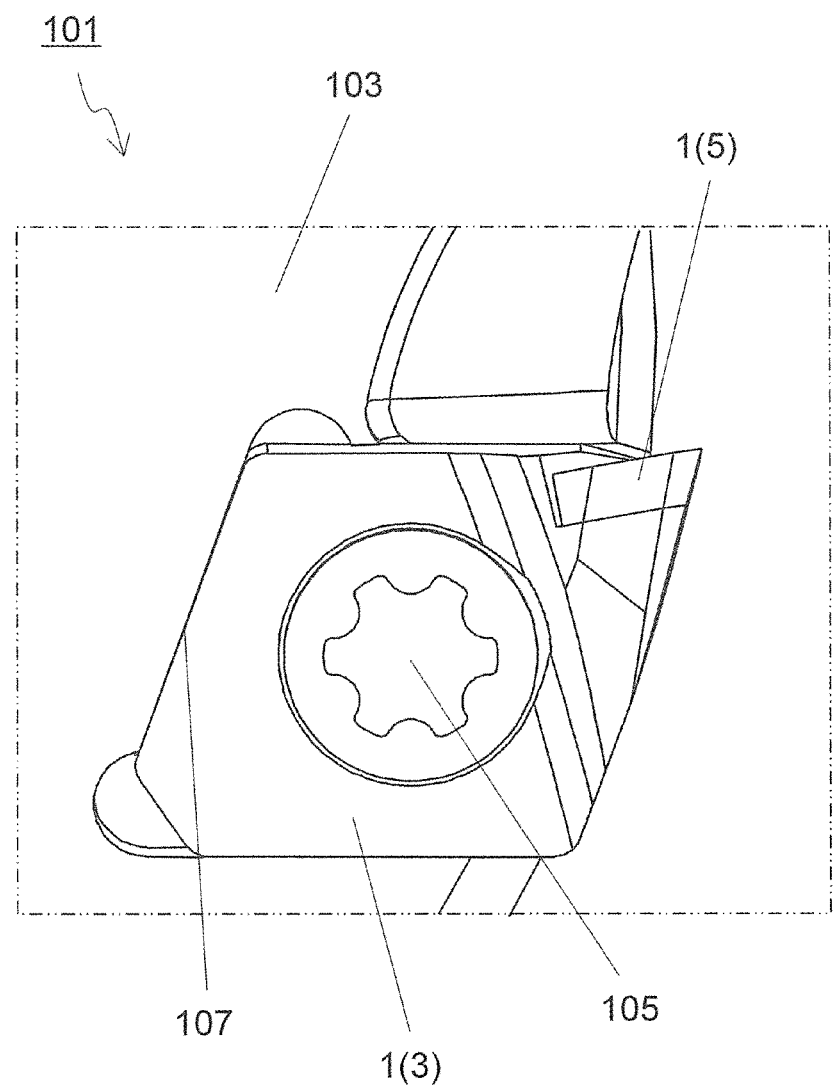
FIG. 5 is an enlarged view in region A2 shown in FIG. 4.
Figure 6:
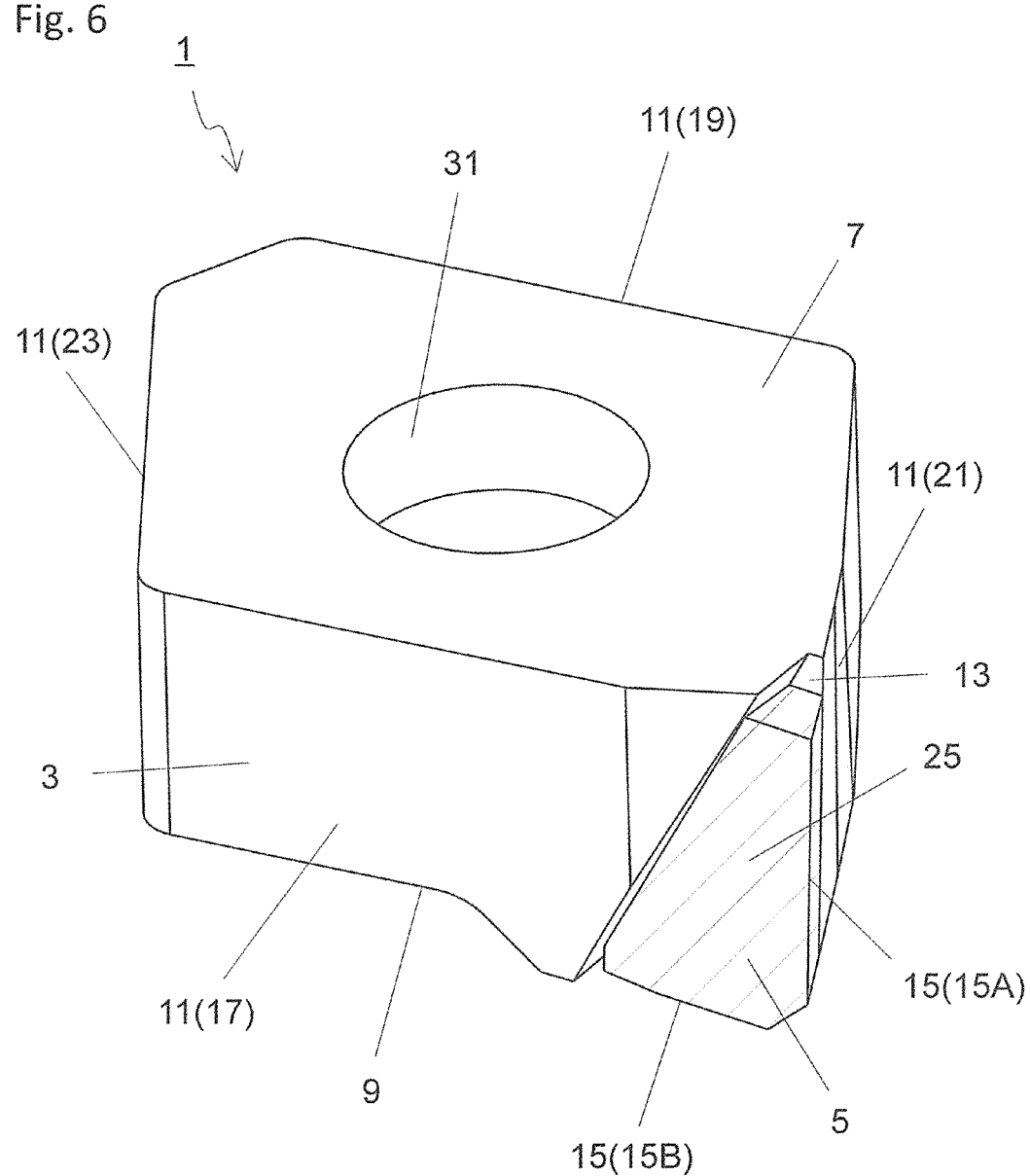
FIG. 6 is a perspective view that shows a cutting insert according to an embodiment.
Figure 7:
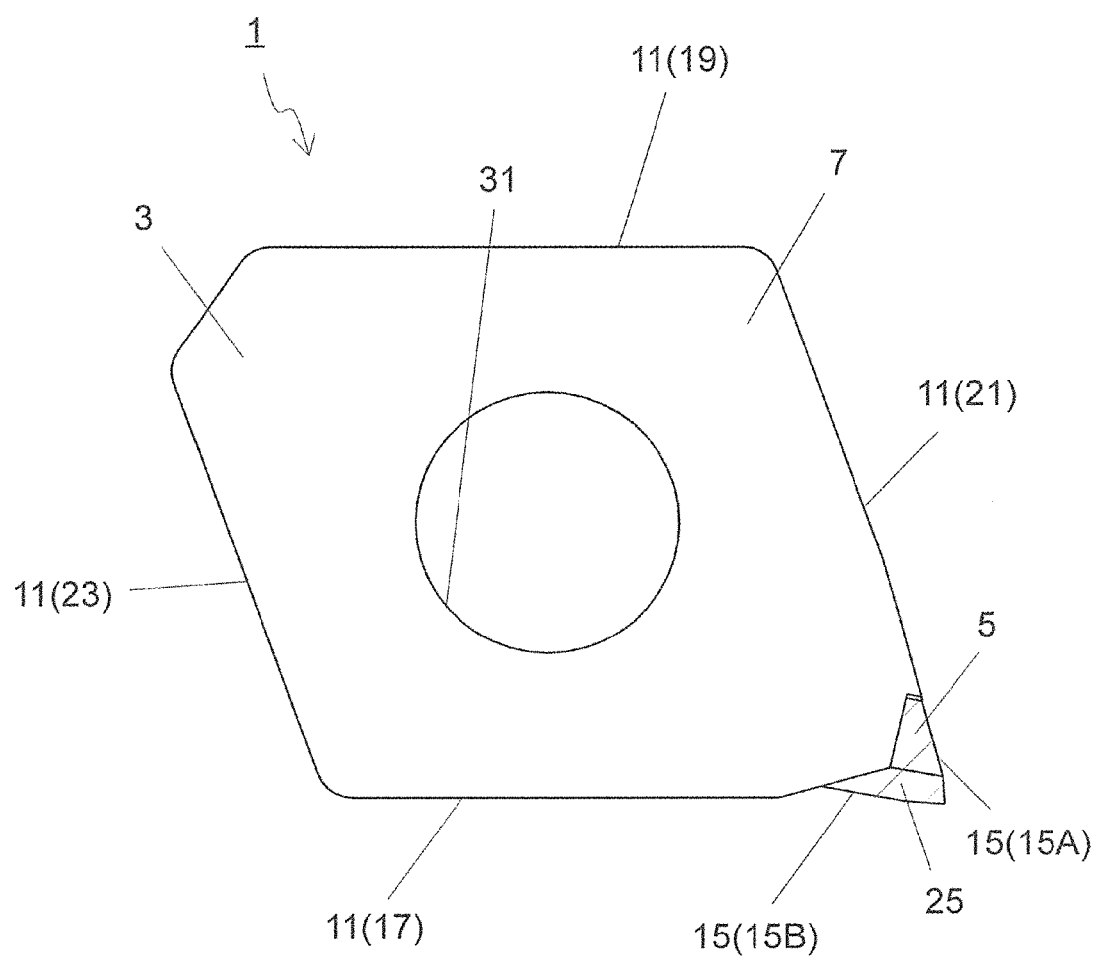
FIG. 7 is a top view of the cutting insert shown in FIG. 6.

In the present embodiment illustrated in FIG. 4, exemplary eight pockets 107 are disposed on the holder 103 and the inserts are respectively located at these eight pockets 107. The number of the pockets 107, and the number of the inserts 1 attached to the holder 103 are not limited to eight. Therefore, both numbers may be, for example, two, three, four, five, six, or ten or more.

In the present embodiment illustrated in FIGS. 6 to 10, each of the inserts 1 is made up of the body member 3 and the cutting member 5, and has a columnar body as a whole. In the instant embodiment, the body member 3 is a columnar body, and the body member 3 is a quadrangular columnar body. The body member 3 includes an upper surface 7, a lower surface 9, and an outer side surface 11. The outer side surface 11 is located between the upper surface 7 and the lower surface 9.

The cutting member 5 is located at a corner part of the outer side surface 11 of the body member 3. In other words, the cutting member 5 is located at a recessed part 13 included in the corner part of the outer side surface 11 of the body member 3. In the present embodiment, each of the inserts 1 are therefore the columnar body as a whole.

The cutting member 5 is fixed to the body member 3. The cutting member 5 is connected to the body member 3 by using a brazing filler metal or the like in the present embodiment. In order to facilitate visual understanding, hatching made up of diagonal lines is applied to the cutting member 5 in FIGS. 6 to 10.

The cutting member 5 is a part of the insert 1 and includes a cutting edge 15 for cutting a workpiece. Also, the cutting member 5 has high hardness to ensure the high strength cutting edge 15 in the insert 1. Thus, the cutting edge 15 is not located on the body member 3 but located on the cutting member 5 in the present embodiment. The body member 3 is a base part in the insert 1 and need not have hardness equal to or higher than that of the cutting member 3. Manufacturing costs for the inserts 1 are reducible while enhancing the strength of the cutting edges 15 because the inserts 1 are thus respectively made up of the body member 3 and the cutting member 5.

For example, cemented carbide or cermet is usable as a material of a member constituting the body member 3. Examples of compositions of the cemented carbide include WC—Co, WC—TiC—Co, and WC—TiC—TaC—Co. WC—Co is producible by adding cobalt (Co) powder to tungsten carbide (WC), followed by sintering. For WC—TiC—Co, titanium carbide (TiC) is added to WC—Co. For WC—TiC—TaC—Co, tantalum carbide (TaC) is added to WC—TiC—Co.

The cermet is a sintered composite material obtainable by compositing the metal with a ceramic ingredient. Specific examples of the cermet include those containing a titanium compound as a main component such as titanium carbide (TiC) or titanium nitride (TiN).

The cutting member 5 is made of a material having a higher hardness than a material constituting the body member 3. Specifically, examples of the material of the cutting member 5 include polycrystalline diamond and monocrystalline diamond. The hardness of the body member 3 and the cutting member 5 is evaluable by measuring Vickers hardness of their respective parts.

For Vickers hardness measurement, a well-known test method can be used. In the method, for example, a pyramid-shaped indenter made of a square pyramid diamond is pressed against the surface of a material, and then measured is an indent that remains after removing a load. When the indenter is pressed against the body member 3, an indent is formed on the body member 3 because the material of the body member 3 is made of the material having a lower hardness than the indenter as illustrated above. When the material of the cutting member 5 is monocrystalline diamond, little or no indent is formed.

In the present embodiment, the upper surface 7 and the lower surface 9 of the body member 3 have a tetragonal shape. The upper surface 7 is a surface that comes into contact with a seating surface of the pocket 107 of the holder 103 when the insert 1 is attached to the holder 103. The lower surface 9 is a surface being exposed to the front end side of the holder 103 when the insert 1 is attached to the holder 103.

The outer side surface 11 of the body member 3 includes four surface regions of a front side surface 17, a rear side surface 19, an outer side surface 21, and an inner side surface 23. The side surfaces 17, 19, 21 and 23 are respectively correspond to sides of the upper surface 7 and the lower surface 9 each having the tetragonal shape (where the side surfaces are named not only from FIG. 6 but also from a positional relationship under a situation of the base member 3 attached to the holder 103). These surface regions have an approximately tetragonal shape in their respective front views.

The front side surface 17 is a surface region located at the front in the rotation direction X1 when the insert 1 is attached to the holder 103. In the front view of the front side surface 17, its width in a direction orthogonal to the rotation axis O1 is larger than its height in a direction along the rotation axis O1. The rear side surface 19 is another surface region located at the rear in the rotation direction X1 when the insert 1 is attached to the holder 103. The rear side surface 19 is located opposite to the front side surface 17, and comes into contact with the pocket 107 when the insert 1 is attached to the holder 103.

The outer side surface 21 is another surface region of the outer side surface 1 which is located closest to the outer peripheral side when the insert 1 is attached to the holder 103. The outer side surface 21 protrudes from the holder 103 in an outer side direction. Although the entirety of the outer side surface 21 protrudes from the holder 103 in the present embodiment, there is no intention to limit to this configuration. For example, a part of the outer side surface 21 which is close to the front side surface 17 may partially protrude from the holder 103 in the outer side direction.

The inner side surface 23 is another surface region located close to the inner peripheral side when the insert 1 is attached to the holder 103, and comes into contact with the pocket 107 when the insert 1 is attached to the holder 103.

The description that the upper surface 7, the lower surface 9, the front side surface 17, the rear side surface 19, the outer side surface 21, and the inner side surface 23 have the tetragonal shape denotes that these surfaces need to have an approximately tetragonal shape but need not to have a strict tetragonal shape. Corners of the surface regions may have a round shape in their respective front views. Also, sides located so as to connect adjacent corners need not to have a strict straight line, but may be partially made into a shape having concave and convex.

The size of the body member 3 is not particularly limited. In the present embodiment, for example, a maximum value of a width between the front side surface 17 and the rear side surface 19 can be set to approximately 5-20 mm in a top view (in a front view of the upper surface 3). A maximum value of a width between the inner side surface 23 and the outer side surface 21 can be set to approximately 5-20 mm in the top view. A maximum value of a thickness between the upper surface 7 and the lower surface 9 is 3-10 mm.

In the present embodiment, the body member 3 includes the recessed part 13. The recessed part 13 is located at a part thereof which corresponds to a region of the front side surface 17 on the outer side surface 11 which is close to the outer side surface 21, corresponds to a region of the outer side surface 21 which is close to the front side surface 17, and corresponds to a corner of the lower surface 9. It can also be said that the recessed part 13 in the present embodiment is located at a part of a corner of the upper surface 7 and a part of the corner of the lower surface 9, besides on the outer side surface 11.

The cutting member 5 is located at the recessed part 13 of the body member 3. The cutting members includes at least three surfaces that are exposed. In the present embodiment, the cutting member 5 has a tetragonal plate shape, and includes a first surface 25 located close to the front side surface 17 of the body member 3 that is exposed. The cutting member 5 also include a second surface 27 located close to the outer side surface 21 of the body member 3, and a third surface 29 located close to the lower surface 9 of the body member 3 that are exposed.

The cutting member 5 includes the cutting edge 15 on an intersecting portion where two of the exposed surfaces intersect each other. The cutting edge 15 includes a first cutting edge 15A and a second cutting edge 15B in the present embodiment. The first cutting edge 15A is located at an intersecting portion of the cutting member 5 where the first surface 25 and the second surface 27 intersect each other. Accordingly, the first cutting edge 15A extends in a direction from the upper surface 7 toward the lower surface 9 of the body member 3 in the present embodiment.

In the present embodiment, the cutting tool 101 is a tool for use in a so-called milling process for cutting a workpiece by causing the holder 103 to move in the direction approximately orthogonal to the rotation axis O1 while the holder 103 is rotating around the rotation axis O1. The first cutting edge 15A therefore functions as a so-called outer side cutting edge configured to mainly cut the workpiece.

The first cutting edge 15A is located over the entirety of the intersecting portion of the first surface 25 and the second surface 27 in the present embodiment. Although the first cutting edge 15A may be located at least on a part of the intersecting portion of the first surface 25 and the second surface 27. The first cutting edge 15A is disposed over the entirety of the intersecting portion of the first surface 25 and the second surface 27 in order to ensure a large height of cut in the present embodiment. The length of the first cutting edge 15A can be set to, for example, approximately 3-7 mm.

The first cutting edge 15A protrudes outward from the outer side surface 11 of the holder 103 when the insert 1 is attached to the holder 103. The first cutting edge 15A has such a straight line form that is inclined so as to approach the rear side surface 19 as going from an end portion of the first cutting edge 15A which is close to the lower surface 9 toward an end portion of the first cutting edge 15A which is close to the upper surface 7. An axial rake $\theta$ of the first cutting edge 15A can be set to, for example, approximately 3-10° when the insert 1 is attached to the holder 103, a.

When the first cutting edge 15A is so located, it is possible to decrease the likelihood that the body member 3 can come into contact with a workpiece during a cutting process of the workpiece.

The second cutting edge 15B is located on an intersecting portion of the first surface 25 and the third surface 29 in the cutting member 5. Therefore, the second cutting edge 15B in the present embodiment extends in a direction along the lower surface 9 of the body member 3.

In the present embodiment, the second cutting edge 15B functions as a "flat cutting edge" to decrease unevenness on a machined surface of the workpiece. Hence, the second cutting edge 15B need not necessarily be disposed over the entirety of the intersecting portion of the first surface 25 and the third surface 29, but is preferably disposed so as to include a part of the second cutting edge 15B which is located close to the outer periphery in a state of being attached to the holder 103 (which is namely a right side of the second cutting edge 15B in FIG. 9). The length of the second cutting edge 15B can be set to, for example, approximately 2-5 mm.

The second cutting edge 15B protrudes toward the front end side of the holder 103 when the insert 1 is attached to the holder 103. The second cutting edge 15B has a downwardly convex shape when viewed from the front in the rotation direction X1 (for example, in FIG. 9). When the second cutting edge 15B is so located, it is possible to minimize the likelihood that the body member 3 can come into contact with the workpiece during the cutting process of the workpiece.

The second cutting edge 15B includes a straight line portion. In the present embodiment, the straight line portion extends from the outer peripheral side in the state of being attached to the holder 103 (i.e., the right side of the second cutting edge 15B in FIG. 9) toward an inner peripheral side. With the second cutting edge 15B that includes the straight line portion, the second cutting edge 15B can function well as the flat cutting edge. A radial rake of the second cutting edge 15B can be set to, for example, approximately 5-20° when the insert 1 is attached to the holder 103.

If the second cutting edge 15B protrudes as describe above, it is possible to avoid that the body member 3 comes into contact with the workpiece without inclining the holder 103 more than necessary.

In the present embodiment, the body member 3 of the insert 1 includes a through hole 31. The through hole 31 is a portion through which the insert 1 is screwed to the holder 103. Specifically, the screw 105 is inserted into the through hole 31 of the insert 1, a front end of the screw 105 is inserted into a screw hole (not shown) that is formed in the pocket 107 and therefore the screw 105 is fixed to the screw hole. Accordingly, the insert 1 is attached to the holder 103.

The through hole 31 penetrates through the center of the upper surface 7 and the center of the lower surface 9 of the main body 3. In other words, the through hole 31 is located from the center of the upper surface 7 to the center of the lower surface 9 of the body member 3, and opens into the center of the upper surface 7 and the center of the lower surface 9. Therefore, the through hole 31 does not open into the outer side surface 11 of the main body 3. In the present embodiment, a penetrating direction of the through hole 31 extends along the rotation axis O1.

If the through hole 31 penetrates through the front side surface 17 and the rear side surface 19, or if the through hole 31 penetrates through the outer side surface 21 and the inner side surface 23, provided that the through hole 31 is identical in size, a small thickness region is formed between the recessed part 13 and the through hole 31 of the body member 3. If the small thickness region exists, the small thickness region can be damaged due to a load applied to the insert 1 during the cutting process.

However, in the present embodiment, because the through hole 31 penetrates through the lower surface 9 and the upper surface 7, the recessed part 13 and the through hole 31 are located away from each other. In other words, the first cutting edge 15A subjected to a large cutting resistance and the through hole 31 are located away from each other. Therefore, a formation of the small thickness region between the recessed part 13 and the through hole 31 can be avoided. This leads to the insert 1 having good durability.

If the through hole 31 is formed from the front side surface 17 to the rear side surface 19, it follows that the head of the screw 105 is located ahead of a chip flow, and hence the head of the screw 105 can be damaged. In contrast, in the present embodiment, the through hole 31 opens into the upper surface 7 and the lower surface 9 in the present embodiment, and therefore, the likelihood of damage to the head of the screw 105 can be reduced.

The first surface 25 of the cutting member 5 is located at the front in the rotation direction X1. Therefore, the first surface 25 in the cutting member 5 functions as "a rake surface" along which chips flow during the cutting process. Hereinafter, the first surface 25 is therefore also referred to as the rake surface. The second surface 27 and the third surface 29 in the cutting member 5 function as "a flank surface" during the cutting process.

Figure 8:
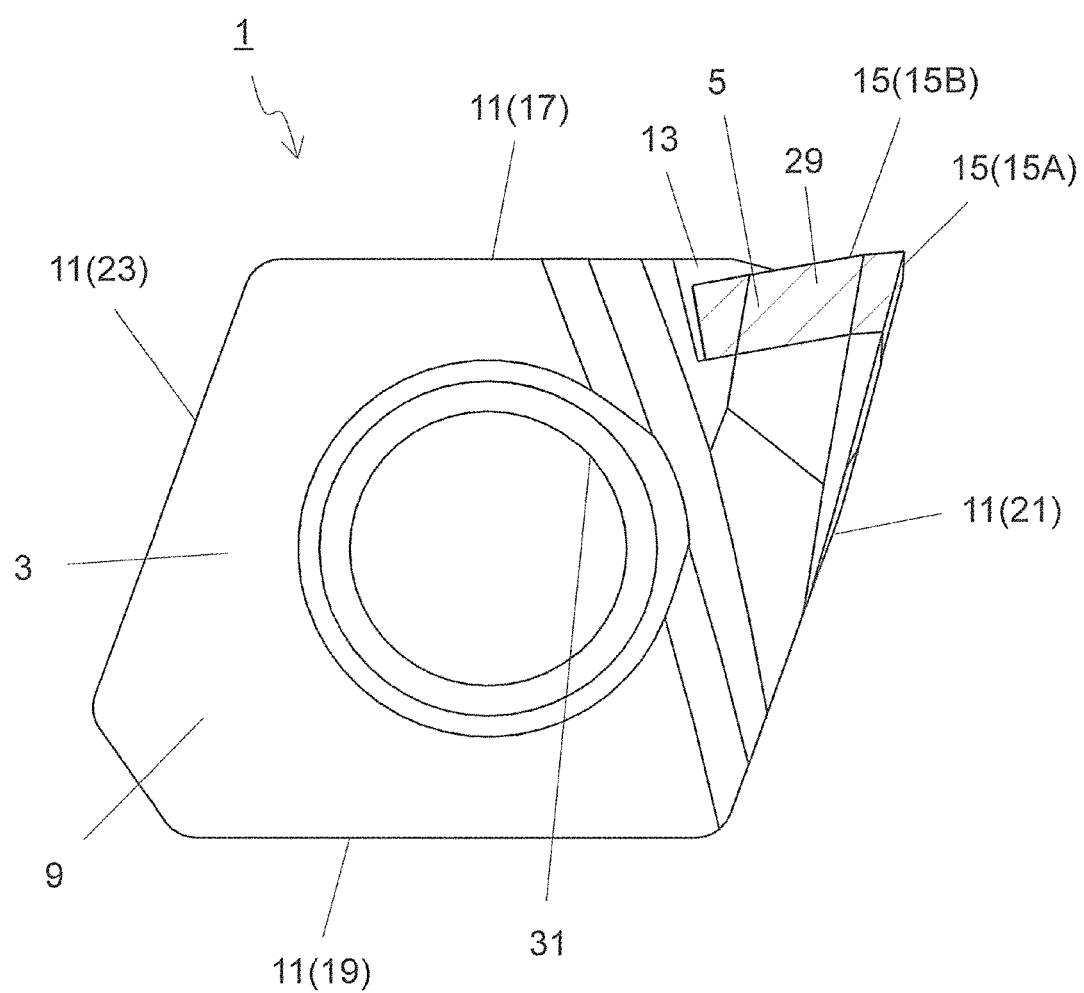
FIG. 8 is a bottom view of the cutting insert shown in FIG. 6.

In the present embodiment shown in FIG. 8, the entirety of the second cutting edge 15B is located closer to the outer peripheral side than the through hole 31. Specifically, the entirety of the second cutting edge 15B is located closer to the outer peripheral side than a middle part of the through hole 31 whose inner diameter is constant. A load due to a principal force is applied from the second cutting edge 15B toward the rear in the rotation direction X1 during the cutting process.

However, because the second cutting edge 15B is located closer to the outer peripheral side than the through hole 31, direct transmit of the load from the second cutting edge 15B toward the through hole 31 can be avoided. As a result, the durability of the insert 1 is further enhanced. The phrase "being located closer to the outer peripheral side" denotes being located away from the rotation axis O1 of the holder 103.

Figure 9:
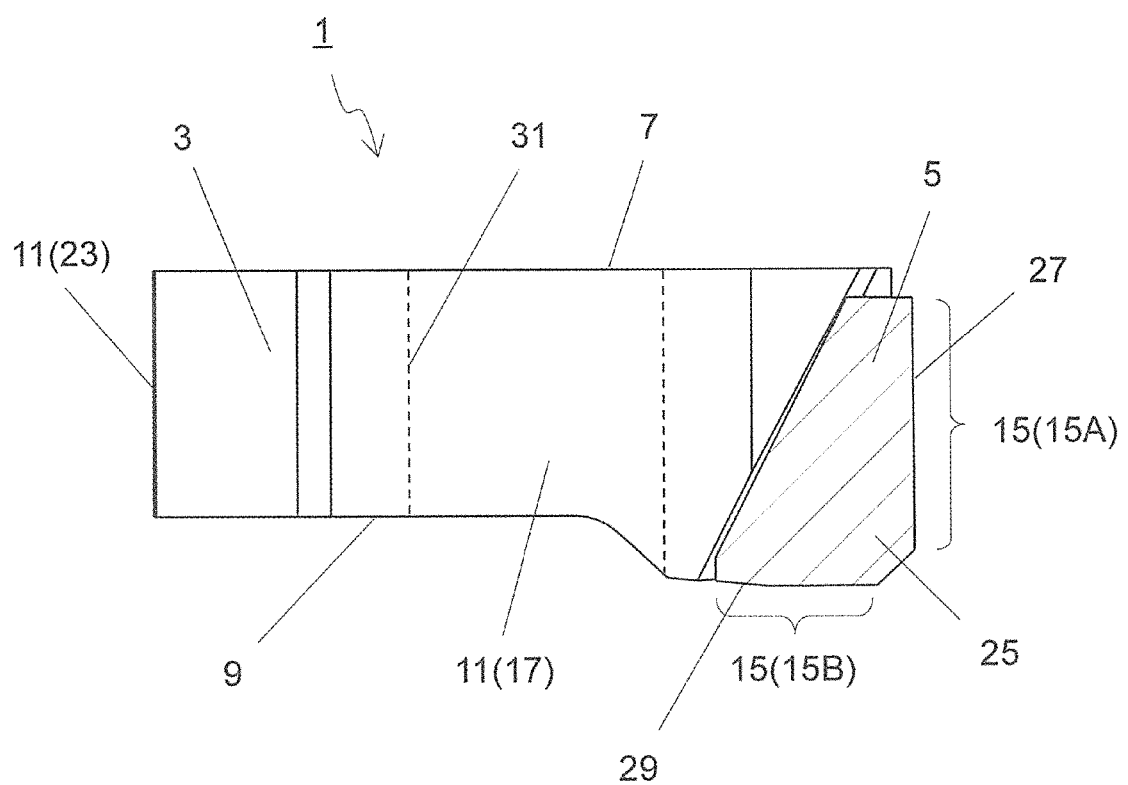
FIG. 9 is a side view of the cutting insert shown in FIG. 6.

In the present embodiment as shown in FIG. 9, for example, a vertical thickness of the body member 3 in the corner part where the cutting member 5 is located is larger than a vertical thickness thereof in a part other than the corner part. Hence, when attached to the holder 103, a part of the body member 3 which is located on the outer peripheral side protrudes toward the front end side. In other words, the inner peripheral side of the body member 3 has a partially indented shape in FIG. 9.

This ensures that the length of the first cutting edge 15A is made longer. It is preferably possible to stably reduce the likelihood that the body member 3 and the holder 103 come into contact with the workpiece during a ramping process in which the holder 103 moves in a direction slightly inclined toward the front end side from the direction approximately orthogonal to the rotation axis O1 while rotating around the rotation axis O1.

Figure 10:
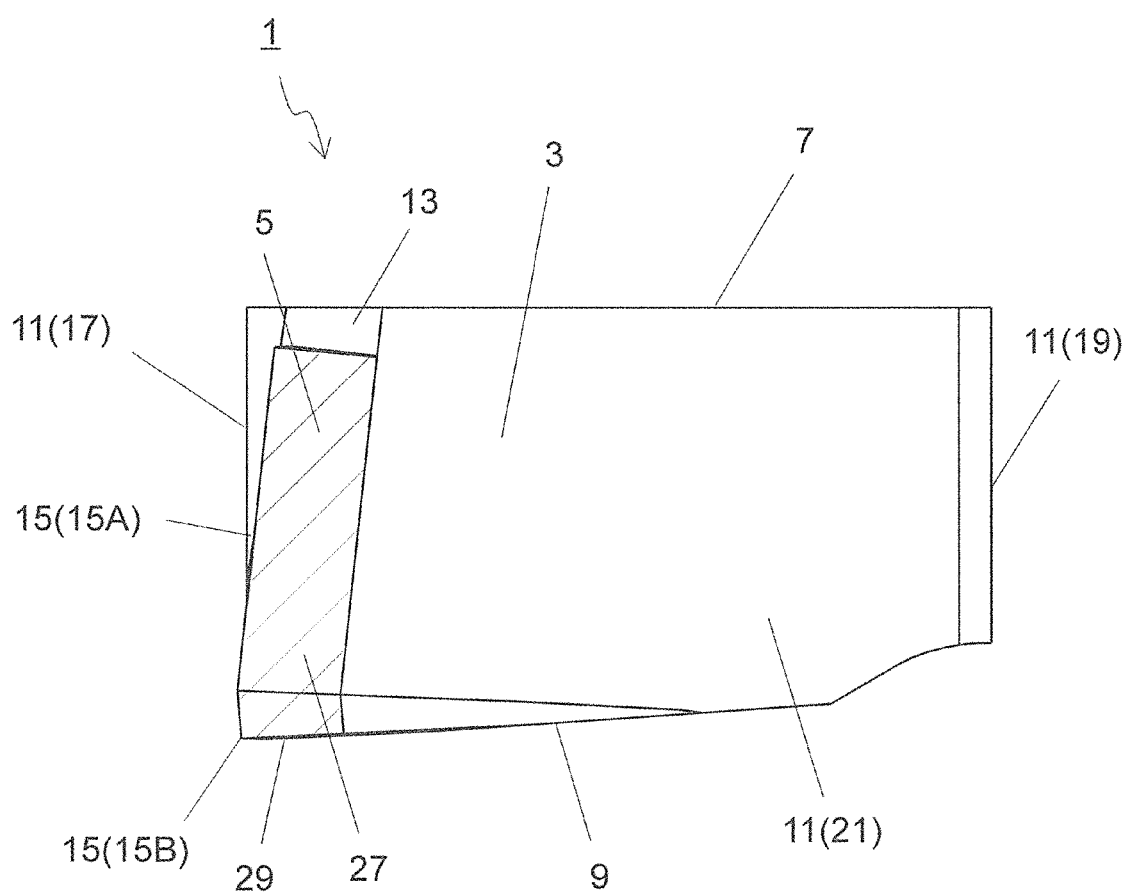
FIG. 10 is a side view when the cutting insert shown in FIG. 9 is viewed along direction A3.

A ridge line where the outer side surface 21 and the lower surface 9 intersect each other is inclined so as to be located closer to the front end side as going toward the front in the rotation direction X1, and he second cutting edge 15B protrudes most toward the front end direction, when the insert 1 is viewed from the side as shown in FIG. 10. This makes it possible to reduce the likelihood that the lower surface 9 comes into contact with the workpiece.

It is also possible to reduce the likelihood that the lower surface 9 comes into contact with the workpiece even when the outer side surface 21 in the body member 3 has the following configuration. That is, a part of the outer side surface 21 which is located close to the front in the rotation direction X1 protrudes toward the front end side when attached to the holder 103. In other words, in the present embodiment, a part of the ridge line where the outer side surface 21 and the lower surface 9 intersect each other, which is located close to the front in the rotation direction X1 protrudes toward the front end side.

In the present embodiment, the insert 1 has a parallelogram shape in which an angle formed by the front side surface 17 and the outer side surface 21 is an acute angle when the insert 1 is viewed from above. This ensures a large distance between the first cutting edge 15A and the through hole 31, thereby making it easier to ensure a large thickness between a concave shaped portion to which the cutting member 5 in the body member 3 is connected, and the through hole 31. It is therefore possible to further enhance the durability of the insert 1.

In the present embodiment, the entirety of the cutting edge 15 is located at the front in the rotation direction relative to the through hole 31. A load is also applied from the cutting edge 15 toward the rotation axis O1 during the cutting process. However, when the entirety of the cutting edge 15 is located at the front in the rotation direction relative to the through hole 31, it is possible to avoid that the load is directly transmitted from the cutting edge 15 toward the through hole 31. Consequently, the insert 1 can have enhanced durability.

While the cutting tool 101 and the insert 1 according to the embodiment have been described in detail with reference to the drawings, the cutting tool and the cutting insert according to the present invention are not limited to the configurations in the above embodiment.

A method of manufacturing a machined product according to an embodiment is described below with reference to the drawings.

The machined product is manufacturable by subjecting a workpiece 201 to a cutting process. The method of manufacturing the machined product in the present embodiment includes the following steps:

(1) rotating the cutting tool 101 represented by the above embodiment around the rotation axis O1;

(2) bringing the cutting edge 15 in the cutting tool 101 being rotated into contact with the workpiece 201; and (3) separating the cutting tool 101 from the workpiece 201.

Figure 11:
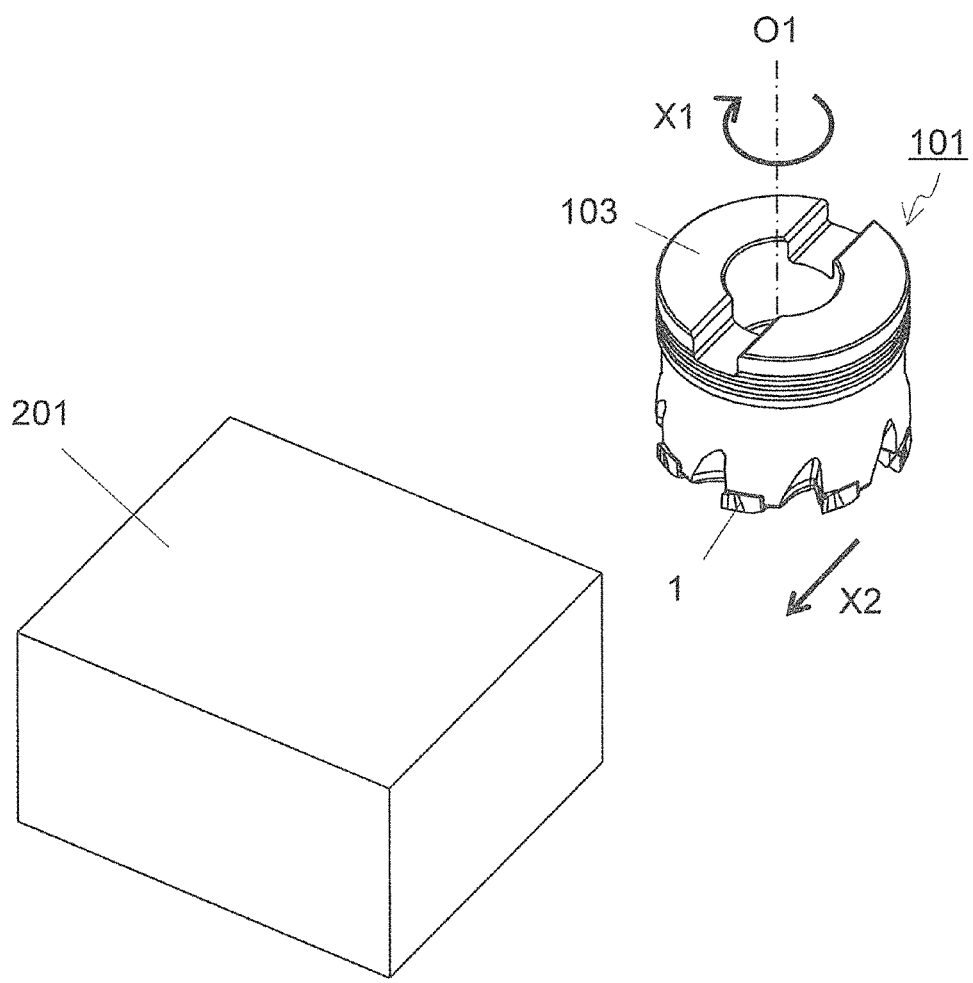
FIG. 11 is a schematic diagram that shows a step in a method of manufacturing a machined product according to an embodiment.
Figure 12:
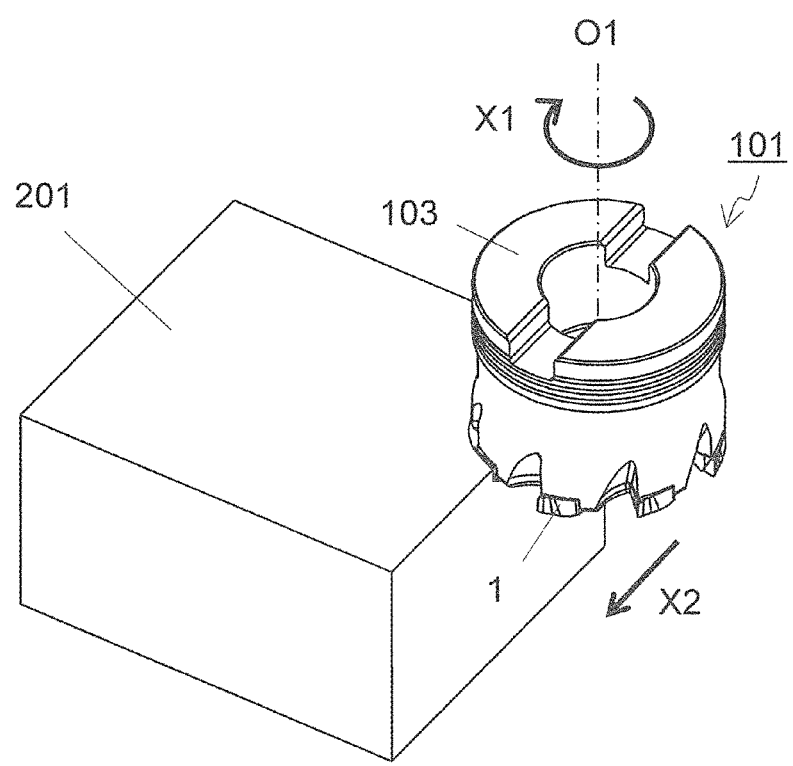
FIG. 12 is a schematic diagram that shows a step in the method of manufacturing a machined product according to an embodiment.
Figure 13:
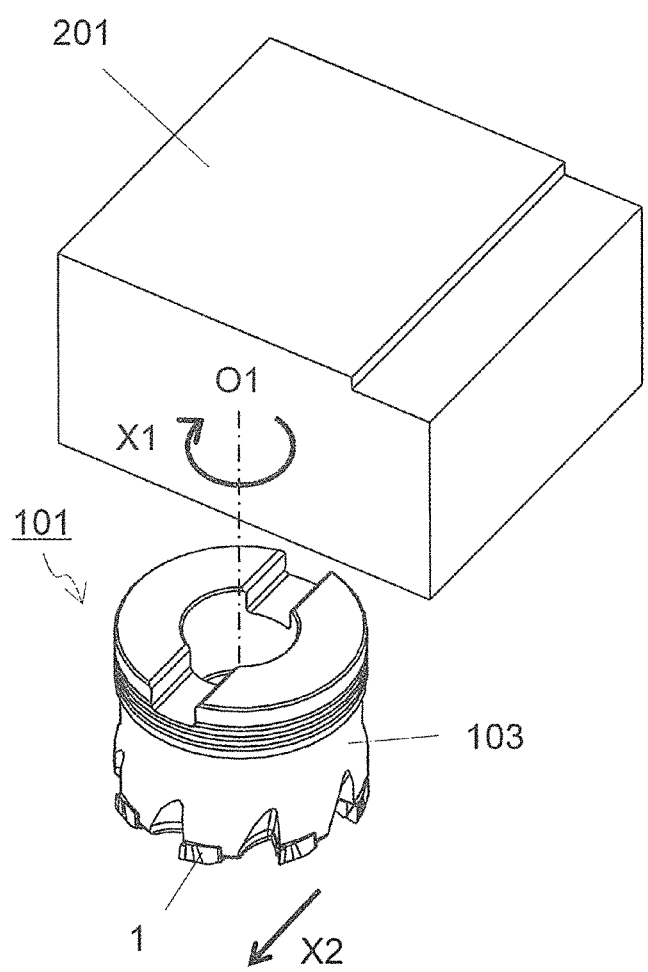
FIG. 13 is a schematic diagram that shows a step in the method of manufacturing a machined product according to an embodiment.

More specifically, firstly, the cutting tool 101 is relatively brought near the workpiece 201 by rotating the cutting tool 101 around the rotation axis O1 and moving the cutting tool 101 in X2 direction as shown in FIG. 11. Subsequently, the workpiece 201 is cut by bringing the cutting edge 15 in the cutting tool 101 into contact with the workpiece 201. As the cutting edge 15, the first cutting edge and the second cutting edge are brought into contact with the workpiece 201 in the present embodiment as shown in FIG. 12. Thereafter, the cutting tool 101 is relatively separated from the workpiece 201 by further moving the cutting tool 101 in the X2 direction as shown in FIG. 13.

In the present embodiment, the cutting tool 101 is brought near the workpiece 201 in a state in which the workpiece 201 is fixed and the cutting tool 101 is rotated around the rotation axis O1. In FIG. 12, the workpiece 201 is cut by bringing the first cutting edge and the second cutting edge of the insert 1 being rotated into contact with the workpiece 201. In FIG. 13, the cutting tool 101 being rotated is separated from the workpiece 201.

In the present embodiment, during the cutting process with the manufacturing method, the cutting tool 101 is brought into contact with the workpiece 201, or the cutting tool 101 is separated from the workpiece 201 by moving the cutting tool 101 in each of the above steps. Nevertheless, there is no intention to limit to such embodiments.

For example, in the step (1), the workpiece 201 may be brought near the cutting tool 101. Similarly, in the step (3), the workpiece 201 may be separated from the cutting tool 101. When the cutting process is continued, it is necessary to repeat the step of bringing the cutting edge 15 in the insert 1 into contact with different portions of the workpiece 201 while keeping the cutting tool 101 rotated.

Representative examples of the material of the workpiece 201 include aluminum, carbon steel, alloy steel, stainless steel, cast iron, and nonferrous metals.

DESCRIPTION OF THE REFERENCE NUMERAL 1 insert
3 body member
5 cutting member
7 upper surface
9 lower surface
11 outer side surface
13 recessed part
15 cutting edge
15A first cutting edge
15B second cutting edge
17 front side surface
19 rear side surface
21 outer side surface
23 inner side surface
25 first surface
27 second surface
29 third surface
31 through hole
101 cutting tool
103 holder
105 screw
107 insert pocket (pocket)
201 workpiece

The invention claimed is:

1. A cutting insert, comprising:
a body member having a columnar shape, and comprising:
an upper surface comprising at least one corner part;
a lower surface opposed to the upper surface;
a side surface between the upper surface and the lower surface, comprising:
a front side surface;
an outer side surface;
an inner side surface opposed to the outer side surface; and
a corner region located between the front side surface and the outer side surface; and
a through hole penetrating through the center of the upper surface and the center of the lower surface; and
a cutting member located at the corner region, and comprising:
at least three surfaces; and
a cutting edge at an intersecting portion of two of the at least three surfaces,
the cutting edge comprises:
a first cutting edge extending in a direction from the upper surface toward the lower surface; and
a second cutting edge extending in a direction along the lower surface,
wherein, in a plan view of the lower surface, a first distance between the through hole and the front side surface is greater than a second distance between the front side surface and a rear end of the cutting member,
wherein the cutting member does not touch the upper surface,
wherein a third distance between the second cutting edge and the upper surface is greater than a fourth distance between the upper surface and the lower surface,
wherein the lower surface comprises a protruding part, and
wherein the third distance is greater than a fifth distance between the upper surface and the protruding part.

2. The cutting insert according to claim 1, wherein the first cutting edge protrudes sideward from the body member.

3. The cutting insert according to claim 1, wherein in a plan view of the front side surface,
the body member comprises:
a first part including the corner region;
a second part that does not include the protruding part; and
a sixth distance between the second part and the outer side surface is larger than a seventh distance between the outer side surface and the first part, and
wherein a thickness of the first part is larger than a thickness of the second part.

4. The cutting insert according to claim 1, wherein the protruding part and the through hole overlap in a plan view of the front side surface.

5. The cutting insert according to claim 1, wherein a sixth distance between the through hole and the outer side surface is greater than a seventh distance between the outer side surface and the cutting member.

6. The cutting insert according to claim 1, wherein the upper surface is flat.

7. The cutting insert according to claim 1, wherein the protruding part is closer to the outer side surface than the inner side surface.

8. The cutting insert according to claim 1, wherein
the body member further comprises a rear side surface opposed to the front side surface, and
the protruding part is spaced apart from the rear side surface.

9. The cutting insert according to claim 1, wherein
the body member further comprises a rear side surface opposed to the front side surface, and
a width of the protruding part along the direction from the upper surface toward the lower surface decreases as the protruding part approaches the rear side surface from the front side surface.

* * * * *